United States Patent
Lee et al.

(10) Patent No.: US 8,371,102 B1
(45) Date of Patent: Feb. 12, 2013

(54) COMBUSTOR CONTROL BASED ON FUEL MODULATION AND PASSIVE OPTICAL SENSORS

(75) Inventors: Jamine Lee, Burlington, MA (US); Neil Goldstein, Belmont, MA (US); Jason A. Cline, Burlington, MA (US); Fritz Bien, Concord, MA (US); Timothy C. Perkins, Billerica, MA (US); Brian F. Gregor, Waltham, MA (US)

(73) Assignee: Spectral Sciences, Inc., Burlington, MA (US)

( * ) Notice: Subject to any disclaimer, the term of this patent is extended or adjusted under 35 U.S.C. 154(b) by 937 days.

(21) Appl. No.: 12/393,595

(22) Filed: Feb. 26, 2009

Related U.S. Application Data (60) Provisional application No. 61/031,557, filed on Feb. 26, 2008.

(51) Int. Cl.
*F02C 9/00* (2006.01)
*F02G 3/00* (2006.01)
*G01K 11/30* (2006.01)

(52) U.S. Cl. .................... 60/39.281; 60/39.24; 702/134; 356/939

(58) Field of Classification Search .............. 60/39.281, 60/39.24; 702/134; 356/425, 939
See application file for complete search history.

(56) References Cited

U.S. PATENT DOCUMENTS

| | | | | |
|---|---|---|---|---|
| 4,457,283 A | * | 7/1984 | Kobayashi et al. | 123/492 |
| 4,770,544 A | * | 9/1988 | Mossey | 374/144 |
| 5,148,667 A | * | 9/1992 | Morey | 60/779 |
| 5,257,496 A | * | 11/1993 | Brown et al. | 60/773 |
| 5,349,811 A | * | 9/1994 | Stickler et al. | 60/776 |
| 5,515,681 A | * | 5/1996 | DeFreitas | 60/740 |
| 5,544,478 A | * | 8/1996 | Shu et al. | 60/773 |
| 5,784,879 A | * | 7/1998 | Dohta et al. | 60/276 |
| 6,640,199 B1 | * | 10/2003 | Goldstein et al. | 702/134 |
| 6,646,265 B2 | * | 11/2003 | Brown et al. | 250/339.15 |
| 6,775,986 B2 | * | 8/2004 | Ganz et al. | 60/773 |
| 6,842,702 B2 | * | 1/2005 | Haaland et al. | 702/18 |
| 6,983,603 B2 | * | 1/2006 | Macchia | 60/772 |
| 7,334,413 B2 | * | 2/2008 | Myhre | 60/803 |
| 7,559,234 B1 | * | 7/2009 | Chorpening et al. | 73/112.01 |
| 2008/0289342 A1 | * | 11/2008 | Sappey et al. | 60/793 |
| 2009/0234555 A1 | * | 9/2009 | Williams et al. | 701/100 |

* cited by examiner

*Primary Examiner* — William H Rodriguez
*Assistant Examiner* — Carlos A Rivera
(74) *Attorney, Agent, or Firm* — Brian M. Dingman; Mirick, O'Connell, DeMallie & Lougee, LLP (57) ABSTRACT

A system for controlling the uniformity of combustion over a range of operating conditions in a combustor with a plurality of fuel nozzles. The system includes a number of optical sensors, each sensor comprising an optical probe that collects naturally occurring optical radiation emanating from a segment of the combustor or combustor exhaust, and at least one transducer that receives the radiation collected by the probes, compares the intensity of collected radiation from each sensor in a plurality of spectral pass-bands that are indicative of the fuel/air ratio in the combustor segments, and produces output signals that are indicative of the state of combustion in the combustor segments. A control system receives the output signals from the transducers and in response controls the fuel flow to the fuel nozzles to achieve an output from each of the sensors that has been determined to be indicative of a predetermined state of combustion.

17 Claims, 7 Drawing Sheets

COMBUSTOR CONTROL BASED ON FUEL MODULATION AND PASSIVE OPTICAL SENSORS

CROSS-REFERENCE TO RELATED APPLICATION

This application claims priority of Provisional application Ser. No. 61/031,557 filed on Feb. 26, 2008. The disclosure of the Provisional application is incorporated by reference herein.

STATEMENT REGARDING FEDERALLY SPONSORED RESEARCH

This invention was made with government support with the United States Air Force under Contract Nos. FA8650-06-M-2643 and FA8650-07-C-2730. The government has certain rights in this invention.

FIELD OF THE INVENTION

This invention relates to the control of combustion uniformity in multi-nozzle combustors, such as turbine engines, using optical sensors and control of fuel flow.

BACKGROUND OF THE INVENTION

Combustion non-uniformity adversely impacts the efficiency, lifetime, and emissions of a combustor and associated machinery. For example, in turbine engines, hot spots at the exit of the combustor limit the operating temperature of the combustor and cause damage to the downstream turbo-machinery. Combustors usually use passive design features, such a large mixing regions, or lean-premixed operation to achieve combustion uniformity, but these approaches have their limits in terms of size, weight, and performance. Even with passive methods, non-uniformities persist. Active control measures can potentially increase combustion uniformity while relaxing the design and performance constraints of passive methods.

An active control system is dependent on a sensor that can sense the state of combustion in the hot flow-path of the combustor and the power-extraction machinery immediately downstream of the combustor. Passive optical sensors can measure the flow-path conditions by collecting emission from the hot gases and particles in the flow path. Spectrally selective detection can yield information on the physical properties of the flow-path such as temperature and product distributions. See, for example, U.S. Pat. No. 6,640,199 and U.S. Pat. No. 6,646,265. These approaches are generally applicable for monitoring the properties at the exit of the combustor, however, optical access to the combustor exit is limited, and it is often desirable to place the sensor with the fuel nozzle at the front end of the combustor. In pre-mixed combustors where the fuel/air ratio is uniform throughout the combustion region, a front-end sensor can collect radiation characteristic of the entire combustor. However, in non-premixed combustors, the sensor must view through multiple combustion zones each with very different fuel/air ratios and optical emission signatures.

Most combustors, such as rich-quench-lean (RQL) combustors, have multiple zones with different fuel/air ratios. The combustion mixture starts out relatively fuel-rich near the fuel injection point, and then becomes successively leaner as the fuel-rich mixture mixes with additional air. The characteristic emission of each combustion zone is different. Emission from the rich zones is dominated by emission from soot and short-lived intermediate species. Emission from downstream, well-mixed areas is dominated by product emission. See: Yamaguci, T., K. T. V. Grattan, H. Uchiyama, and T. Yamada, "A Practical Fiber Optic Air-Ratio Sensor Operating By Flame Color Detection," *Review of Scientific Instruments*, 68(1): 197 (1997); Docquier, N., Belhafaoui, S., Laca, F., Darabiha, N., Folon, J-C, *Proc. Combust. Inst.* 2000, 28: 431-8; and U.S. Pat. No. 7,334,413 teach control using a sensor placed at or near the fuel nozzle to monitor the emissions from the active flame front in premixed natural-gas flames. These sensors use the ratio of emission intensity in two spectral bands, such as the CH band at 0.43 microns, the $C_2$ band 0.52 microns, and the OH band at 0.31 microns as an indicator of overall fuel/air ratio. These systems are applicable to some, but not all low-pressure combustors, and to high-pressure premixed combustors using natural gas as a fuel. However these spectral bands are not generally applicable in combustors with a high fuel/air ratio in the primary zone or high-pressure, liquid fueled combustors, as emission from soot and soot precursors overwhelm the weaker CH and $C_2$ emissions. Other alternative spectral bands must be used in combustors that produce a large amount of interfering visible emission.

Intensity-based passive optical sensors based on intensity fluctuations are used extensively to monitor the presence of a flame and to sense and control dynamic instabilities at low fuel/air ratio, but the sensed signal is not proportional to the fuel/air ratio over the full range of operating conditions and cannot be used for active control of combustion uniformity. U.S. Pat. No. 5,257,496 teaches the use of intensity-based optical sensors to control uniformity in a turbine engine in a lean-burn state with a specific fuel/air ratio set to produce a combustion temperature of 1700° F., but this technique is not suitable for turbine engines, such as aero-engines, that must operate over a range of fuel/air ratios.

Thus, a need exists for a sensor system that can sense the state of combustion over a range of fuel/air ratios and can be used in conjunction with fuel modulation to actively control combustion uniformity. The sensor should be able to monitor downstream fuel/air ratio from a location adjacent to the fuel nozzle, and should produce an output that is proportional to the state of combustion in the combustor segment influenced by the fuel nozzle.

SUMMARY OF THE INVENTION

This invention relates to the control of combustion uniformity in multi-nozzle combustors, such as turbine engines, using optical sensors and control of fuel flow. The optical sensor senses the state of combustion in a local volume influenced by the fuel nozzle. Fuel modulation is used to test and measure the response of the combustor to fuel flow. The fuel flow to the various fuel nozzles is then adjusted to achieve combustion uniformity.

This invention comprises in one aspect a system and method of controlling combustion uniformity using modulation of fuel flow and passive optical sensors that are responsive to the local fuel/air ratio in the segment of the combustor influenced by the controlled fuel flow. The sensors and control system are suitable for use in combustors, such as turbine engines, in which there are multiple fuel injection locations. A sensor may be co-located with a fuel nozzle so that the field of view of each sensor corresponds to the segment of the combustor that is influenced by the nozzle. The sensor signals can then be used to trim the fuel flow to the injectors to obtain essentially uniform output from all sensors, thereby achieving more uniform combustion throughout the combustor.

Each optical sensor consists of an optical probe and transducer, where the optical probe collects the naturally occurring radiation emanating from a defined volume of the hot flowing gas stream (a segment) and transmits the emitted radiation to the transducer. The transducer measures the intensity of radiation within a plurality of spectral bands and determines the fuel/air ratio in that combustor segment based on the relative intensities of the multiple bands.

This invention is particularly useful for monitoring and controlling combustors that are not premixed and operate over a range fuel/air ratios. In many combustors, such as Rich-Quench-Lean (RQL) combustors used in many turbine engines, there are multiple zones, which have very different fuel/air ratios and combustion conditions, such as a rich region, a transition region, and a lean region. Each region has unique conditions and characteristic optical emission and absorption phenomena that affect the optical signal collected by the probe. This invention allows the tuning of the spectral bands used, the viewing geometry, and the methods of data processing, to exploit the known combustion patterns for a particular combustor design, thereby producing a sensor output that is representative of the overall fuel/air ratio of the entire combustor segment.

Fuel modulation can be used both as a means of controlling the fuel/air ratio in response to the sensor signal, and as part of the sensor measurement and calibration process. In a typical control system, the fuel flow to each fuel nozzle can be controlled using a valve that is responsive to the output signal from an optical sensor. In some cases, both the dependence of the sensor output signal on local fuel/air ratio and the dependence of fuel/air ratio on fuel flow are known a priori, and the fuel flow can be controlled to achieve the desired sensor output signal indicative of the desired fuel air ratio.

In the most general case, it is desirable to control the combustor based on the response of the sensor to fuel modulation. The dependence of the distribution of local fuel/air ratios on fuel flow to a single nozzle is not known a priori, so that it must be measured. In this case, the sensed variable is the response of the sensors to the modulation of each fuel nozzle. A global control system can modulate each of the fuel injectors in turn, or alternatively simultaneously but with unique waveforms, while measuring the response of all of the sensors in the combustor, thereby determining a matrix of partial derivatives indicating the variation in signal from each sensor with the change in fuel flow from each fuel nozzle. The control system can then solve a global minimization problem to find a combination of fuel flow adjustments that best reduces the segment-to-segment variations observed by the sensors. The control system then may adjust the fuel flow to approach this condition.

Monitoring the response to fuel modulation has the further advantages of redundancy and self-calibration. Multiple sensors with overlapping fields of view can measure the response of the combustor to modulation of a single fuel nozzle. Calibration of each sensor can be measured in place by modulating the fuel flow by a known amount and measuring the sensor response to compute the partial derivative of the sensor output with respect to fuel flow in a specific fuel nozzle. The control system may also keep a record of the response function calibration of each of the sensors as a function of time, and this data may be correlated with other system parameters to develop engine prognostics and fault diagnostics.

The invention also includes an optical probe for collecting the optical signals from the combustor segment. The probe is typically packaged as part of the fuel nozzle, or may be incorporated in another mechanical assembly. The probe mechanical assembly is inserted through the combustor wall so that the front end is exposed to the combustion environment, which may have temperatures in excess of 2000° C., and the rear end is outside the combustion environment in a lower-temperature environment. The mechanical assembly supports a number of optical components in a precise orientation. The optical components may include a sapphire or quartz optical element that may be exposed to the combustion environment, and additional elements that transmit the collected light to a transducer device. The optical components can include transmissive rods, prisms, optical fibers, mirrors, or refractive elements. The optical components of the probe define a specific field of view for the sensor, which is typically a conical volume starting at the front end of the sapphire rod and extending into the combustor with a defined angular extent.

The transducer contains the electronics for converting the optical signal to an electrical signal. It can either be packaged within the probe mechanical assembly, or may be located in a separate location and be connected to the probe by optical fibers. The distant transducer may be a common readout for multiple optical sensors and may be collocated with the control system. If packaged with the probe it may be actively cooled by the fuel-flow to the fuel nozzle, or fiber optics can be used to transmit the radiation from the probe assembly to a distant transducer.

The optical sensor of this invention may include a number of variants designed for use in specific combustion systems. Each variant is defined by a specific combination of a defined field of view, specific spectral bands, and methods of comparing the spectral bands to develop the output signal. The fields of view and spectral bands are selected so that there are two or more spectral bands that each have a different functional relationship to fuel/air ratio. Some bands may be responsive to one zone of the combustor, and others to other zones of the combustor. A ratio of two bands, or ratios of combinations of bands, produces an output signal that is proportional to the segment-averaged fuel/air ratio and independent of the absolute intensity of the collected radiation.

This invention features a system for controlling the uniformity of combustion over a range of operating conditions in a combustor with a plurality of fuel nozzles, the system comprising a plurality of optical sensors, each sensor comprising an optical probe that collects naturally occurring optical radiation emanating from a segment of the combustor or combustor exhaust within which combustion is primarily influenced by one or a small set of nozzles, and at least one transducer that receives the radiation collected by the probes, compares the intensity of collected radiation in a plurality of spectral pass-bands that are indicative of the fuel/air ratio in the combustor segments, and produces output signals that are indicative of the state of combustion in the combustor segments, and a control system that receives the output signals from the transducers and in response controls the fuel flow to the fuel nozzles to achieve a predetermined pattern of output signals that is indicative of a predetermined state of combustion.

The combustor may be part of a turbine engine, in which case the optical probes may be located within the pressure casing of the engine and collect radiation from the high-temperature flow path and transmit the radiation to a transducer located in a cooler region. The optical probe may be packaged within a fuel nozzle that influences the state of combustion within the field of view of the optical probe. The fuel valve that controls the flow may be packaged with the fuel nozzle.

The combustor may have a fuel-rich primary combustion zone, and the spectral pass-bands and the comparison may produce an output signal that is a function of fuel/air ratio at full power setting, based on the characteristic optical emissions from the fuel-rich primary combustion zone. The probe may collect radiation from at least one defined volume within the field of view of the probe, which extends from the probe through the hot-gas path to a solid object, and includes different zones of the combustor with different combustion conditions and the surface of the solid object.

The transducer may produce an output signal that is a function of the relative intensity observed in a plurality of pass bands, where that function is independent of the overall intensity of the emission and has a monotonic dependence on fuel air ratio within an operating range about a nominal set point. The functional form of the output signal may include a dependence on the nominal set point and its associated characteristic optical emissions and may weight specific spectral pass-bands differently at different nominal operating setpoints. The intensity of a molecular emission band may be corrected for the intensity of underlying background radiation using a measurement of intensity in a separate pass-band.

The transducer may take the ratio of intensity in two spectral pass-bands at two different wavelengths that originate from the same species. The spectral pass-bands may comprise soot emission in the visible and near-visible spectral range of 0.35-1.2 microns. The transducer may compare the ratio of intensity in at least one spectral pass-band arising from chemiluminescent radiation in the ultraviolet spectral range of 0.2-0.4 microns and at least one spectral band at a longer wavelength arising in part from soot. The transducer may compare at least one of the spectral pass-bands that is associated with polyaromatic hydrocarbons emitting in the range of 0.3-0.4 microns.

Each probe may comprise a high-temperature transmissive optical element exposed to the hot flow stream so as to collect naturally emitted radiation from the hot flow stream, and an optical fiber element that transmits the collected radiation to the transducer located in a colder region. The control system may comprise a matrix of variations comprising the response of each sensor with respect to the changes of fuel flow to each nozzle. The response of the sensors to fuel flow and nominal combustor conditions may be used in calibration of the control system, prognostics of combustor condition, or fault diagnostics. The control system may adjust the fuel flow to the nozzles so as to reduce variations of sensor output signals among at least a plurality of the segments.

The invention also features a system for controlling the combustion of fuel delivered to a combustor through a plurality of fuel nozzles, comprising at least one optical sensor, each sensor comprising an optical probe that collects naturally occurring optical radiation emanating from the segment of the combustor within which combustion is affected by fuel delivered by each fuel nozzle, and at least one transducer that receives the radiation collected by the probes and produces an output signal indicative of the state of combustion in the combustor segments, and a control system that causes controlled modulation of the fuel flow to each nozzle and determines the variation of the transducer signals with respect to such modulations, and in response controls the fuel flow to the fuel nozzles to achieve a predetermined state of combustion.

The output signal produced by the transducer may be the result of comparing the intensity of radiation in a plurality of spectral bands. The control system may adjust fuel distribution among the nozzles to achieve uniformity of combustion, as measured by the uniformity of the sensor signals. The control system may adjust fuel distribution among the nozzles to achieve uniformity of combustion, by equalizing the variation of the sensor signals with respect to fuel adjustment of each nozzle. At least some of the segments may overlap one another.

The invention further features an optical sensor for collecting naturally emitted radiation from a hot section of a combustion-based system, the sensor determining the effect of combustion within a volume defined by the sensor field of view, comprising an optical probe comprising a transmissive sapphire rod with a first end exposed to the hot flow stream so as to collect naturally emitted radiation from the hot flow stream, a reflective surface that alters the path of collected radiation leaving the other end of the sapphire rod, and an optical fiber element that transmits the reflected radiation, and a transducer, located in a colder region that receives light from the optical fiber and compares radiation in a plurality of spectral bands to produce an output signal proportional to a physical property of the volume within the probe field of view. The optical probe may be incorporated into a fuel nozzle which has an associated valve, responsive to the sensor, that controls the flow of fuel through the fuel nozzle. The output signal may be used in the control of the fuel/air ratio of a combustor.

Further featured in the invention is an optical sensor for collecting naturally emitted radiation from a hot section of a combustion-based system, the sensor determining the effect of combustion within a volume defined by the sensor field of view, comprising an optical probe comprising a turning prism made of high-temperature transmissive material, the prism located and arranged to collect naturally emitted radiation from the hot flow stream and an optical fiber element that transmits the collected radiation to a colder region, and a transducer that receives light from the optical fiber and compares radiation in a plurality of spectral bands to produce an output signal proportional to a physical property of the volume within the probe field of view.

The optical probe may be incorporated into a fuel nozzle which has an associated valve, responsive to the sensor, that controls the flow of fuel through the fuel nozzle. The sensor may further comprise a lens or curved reflector element in the path of the collected radiation to modify the field of view of the sensor. The sensor may collect radiation from multiple fields of view, to measure different volumes within the hot flow path. The physical property of the volume may include the properties of the surface of a solid within the field of view. The output signal may be used in the control of the fuel/air ratio of a combustor.

BRIEF DESCRIPTION OF THE DRAWINGS

Other features and advantages will occur to those skilled in the art from the following description of the preferred embodiments and the accompanying drawings in which.

DETAILED DESCRIPTION OF EMBODIMENTS OF THE INVENTION

Figure 1:
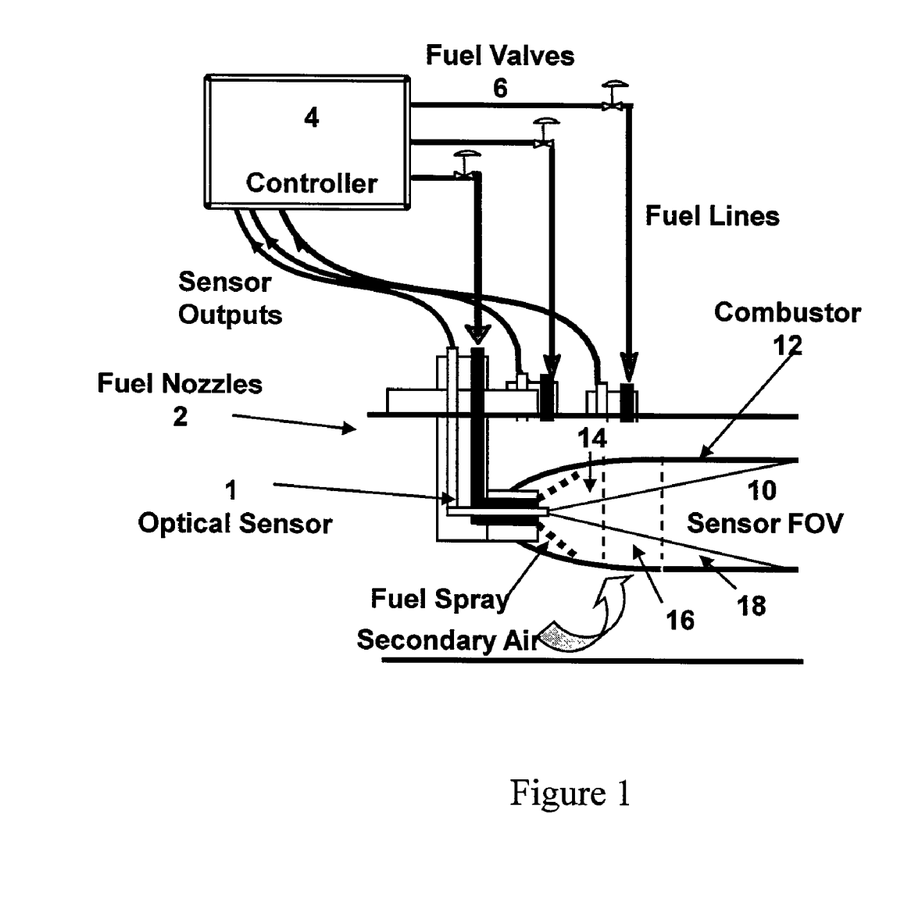
FIG. 1 is an overview of the inventive combustor control system.

FIG. 1 shows an overview of a combustor control system based on fuel control and passive optical sensors. Optical sensors 1 are packaged within fuel nozzles 2 and coupled to a controller 4 which controls a set of fuel valves 6. Each optical probe collects radiation from a conical field of view (FOV) 10 extending from the fuel nozzle into the combustor 12. The field of view includes a number of zones including a rich zone 14 near the nozzle, a transition zone 16 where secondary air is introduced, and a secondary zone 18 where mixing and combustion is completed. The sensor may collect and process radiation from one or more of these zones. Signals from the sensors are directed to controller 4 that compares the signal from each nozzle and modulates the fuel flow to reduce the overall variation in combustion uniformity, or pattern factor, at the combustor exit. In the preferred embodiment, shown in FIG. 1, a central control system is used to compare the signals from multiple combustor segments and shift fuel flow among the nozzles to achieve uniform fuel/air ratio throughout the system.

In a preferred embodiment, each fuel nozzle has an associated fuel valve, which may be packaged with the fuel nozzle and optical probe in a single unit.

Figure 2A:
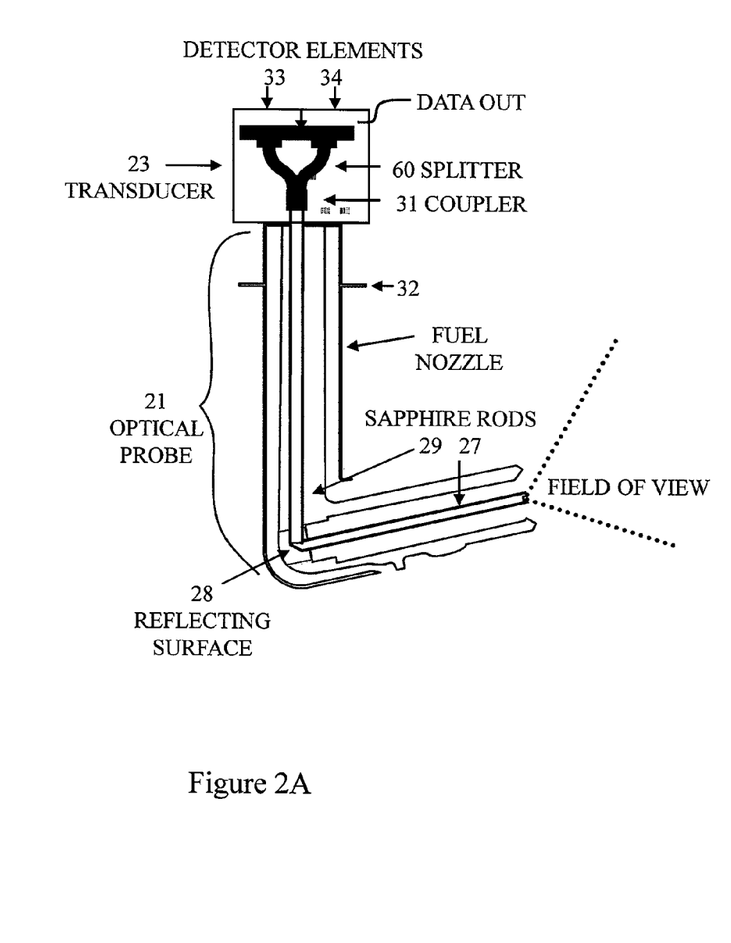
FIGS. 2A and 2B show two sensor configurations for the invention.
Figure 2B:
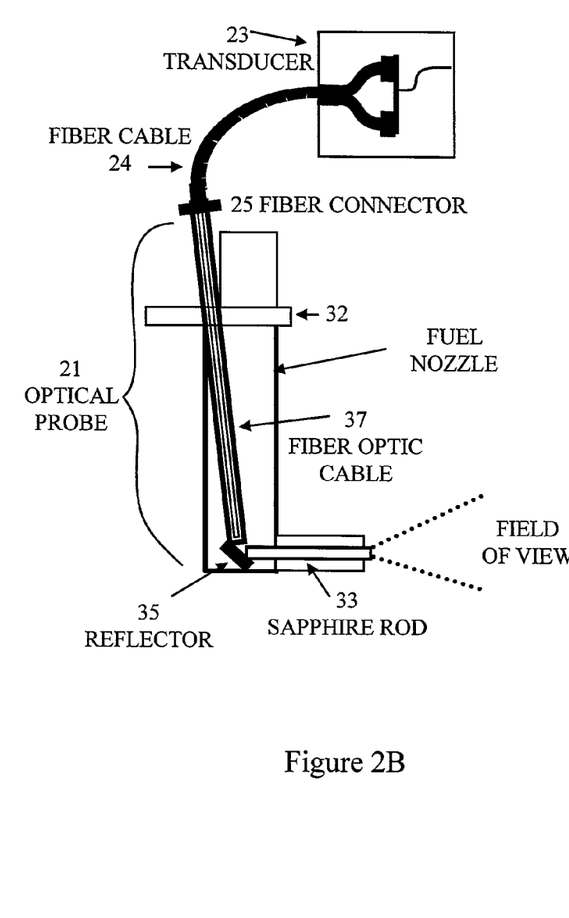
Figure 3A:
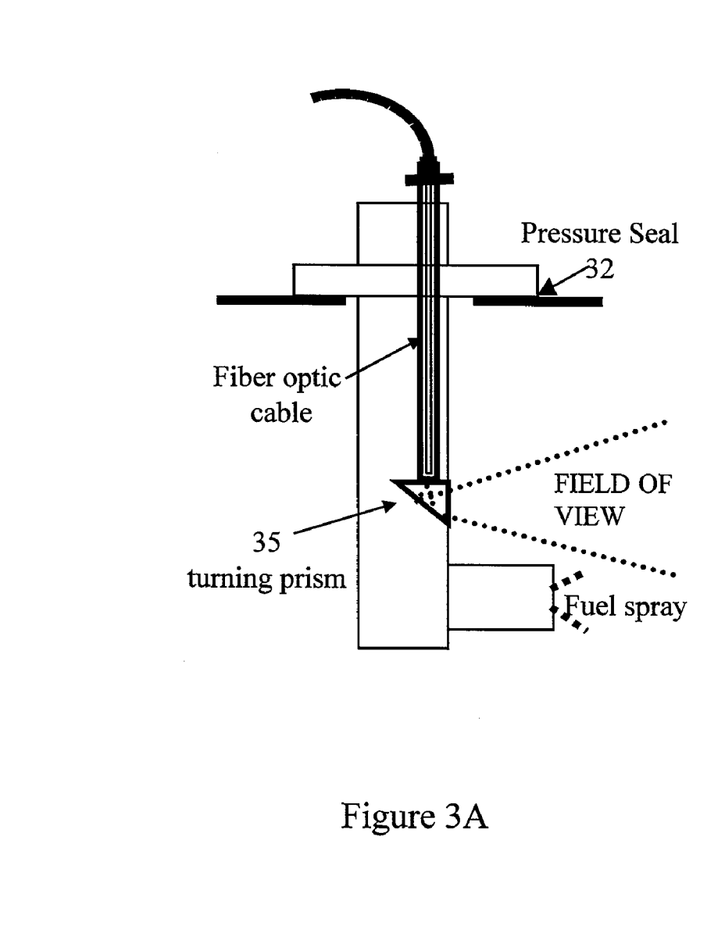
FIGS. 3A and 3B show two alternative probe designs for the invention.
Figure 3B:
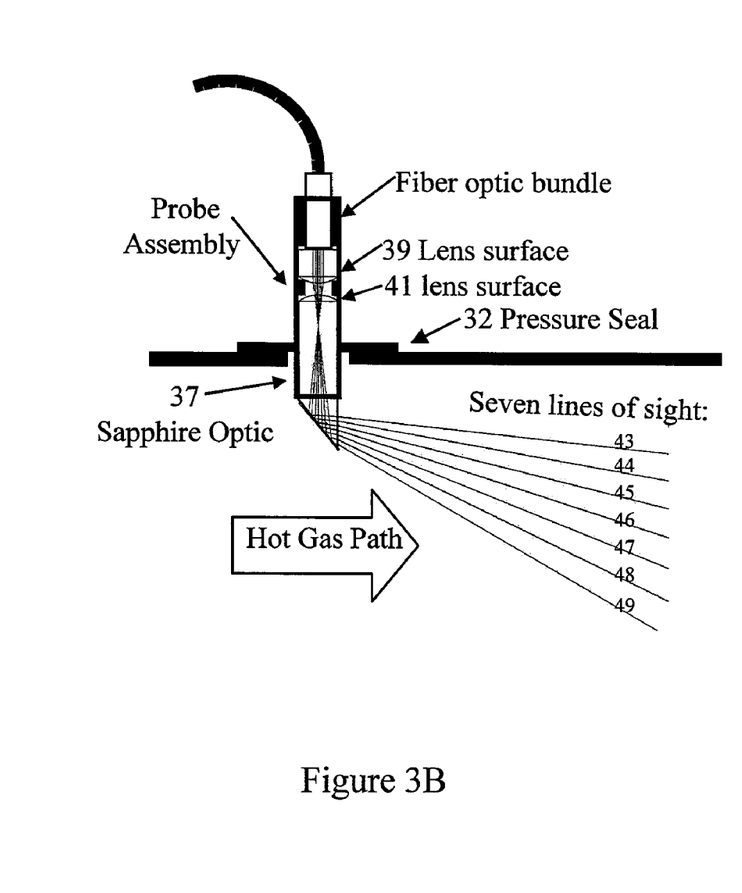

FIGS. 2 and 3 show four configurations for the sensor. In FIG. 2A the optical probe 21 and transducer 23 are packaged within the fuel nozzle. The transducer contains a splitter 60 that directs the light to two or more detector elements 33 and 34, each with a different spectral bandpass. The detector elements may be elements of a single detector array, each of which measures the intensity within a unique spectral passband. In FIG. 2B, only the probe is contained within the fuel nozzle. Optical radiation from probe 21 is coupled into an optical fiber or fiber bundle 24 that attaches at connector 25 and transmits the radiation to a distant transducer 23. In FIGS. 2A and 2B the probe is packaged in the fuel nozzle, with fuel jets arranged in a circular pattern around the optical probe.

FIGS. 3A and 3B show two alternative configurations for the optical probe. In FIG. 3A the probe is packaged in the fuel nozzle housing but views the flow from a viewpoint slightly displaced from the fuel injection point. In FIG. 3B the probe is packaged in a separate probe assembly.

Optical Probe

In each configuration, the optical probe and its mechanical housing penetrates the pressure vessel and/or combustor liner and makes a seal with a flange 32. The transmissive optical element closest to the hot combustion flow also provides a seal that prevents penetration of the hot combustion gas into the mechanical housing. The probe and its mechanical housing are exposed to a large range of temperatures. The front end is exposed to the hot combustor gas that may reach 2200° C., the middle section is often exposed to compressor air at temperatures up to 500° C., and the portion outside the pressure vessel is exposed to near ambient conditions. The front-end transmissive element is made of high-temperature optical materials, such as sapphire or quartz. Moderate temperature materials such as metal-clad optical fibers may be used on the interior of the probe. The transducer electronics can be mounted in the cooler end of the probe and may use fuel-cooling or convective air cooling to maintain an appropriate operating temperature.

The optical elements of the probe can include optical fibers, transmissive rods, reflectors and turning prisms. In FIG. 2A, the optical probe consists of two sapphire rods, 27 and 29. One rod includes a turning prism 28 machined onto one end that reflects the light through an angle and into the second rod. Alternatively, the turning prism may be a separate piece. The field of view of this probe is determined by the angle of internal reflectance of sapphire at the sides of the rod and the turning prism. The field of view can be reduced further by placing apertures or an optical fiber with a limiting angular acceptance in the optical train. For example a fiber-based splitter may use optical fibers with an angular acceptance less than the sapphire rod, thus restricting the field of view of the probe.

FIG. 2B shows an alternative embodiment for the optical probe, which includes a sapphire rod 33, a reflector 35, and a fiber-optic element 37. The sapphire rod and fiber are inserted into cylindrical bores in the mechanical housing. The reflector is placed at an angle that will reflect light from the sapphire rod into the fiber element. The fiber element may be a single fiber or a bundle of fibers. The fiber element is contained in a protective jacket. The fibers may be metal-clad silica fibers with operating temperatures in excess of 500° C. The field of view of the probe is determined by the numerical aperture of the fibers.

The reflector can be a mirror made from a reflective ceramic, corrosion resistant metal or a substrate with a reflective coating. The reflective surface may have a protective overcoat of $TiO_2$, $Al_2O_3$ or other dielectric material. The surface quality may be smooth to maintain the field of view, or may be textured to increase the field of view using diffuse reflectance.

FIGS. 3A and 3B show two alternative optical configurations for the probe. In FIG. 3A the probe uses a turning prism 35, both as a reflector and to provide a transparent surface exposed to the combustion zone. The turning prism may be made of sapphire or quartz, or other high-temperature transmissive material, and use total internal reflectance at the reflecting surface. Alternatively, it may be have a rear-surface metallic reflector on the reflecting face. The turning prism may be a simple right-angle prism, such as the one shown in FIG. 3A, a penta-prism, or any compound shape that utilizes an internal reflection off a planar surface.

FIG. 3B illustrates the use of a compound turning prism 37 machined into a sapphire rod. FIG. 3B also illustrates the use of multiple fiber-optics to view the combustor conditions over a plurality of well defined lines of sight, 43-49. Lens elements 39 and 41 are used to image the flow volume onto a fiber bundle. Alternatively, curved reflective surfaces could be used a part of the imaging optics. Adjacent fibers then view adjacent narrow fields of view. Such a probe provides spatial resolution to identify the exact location of structural features in the hot flow gas. A complete image of the field of view may be resolved using a fiber bundle with many elements.

In each of the embodiments shown in FIGS. 2 and 3, the field of view of the sensor is defined by the optical elements of the probe. In FIG. 2A, the field of view is aligned along the sapphire rod axis, and limited by the internal reflectance angle of the sapphire rods. In FIGS. 2B and 3A, the field of view is defined by the numerical aperture of the fiber and the orientation of the fiber and reflector. In FIG. 3B the field of view is modified by the lens elements which image the fiber aperture onto the flow volume. In alternative embodiments, the field of view of the probe may be modified by machining a tip of the sapphire rod or changing the angle between the fiber central ray and the sapphire rod axis, to direct the light in a preferred direction. Alternatively, scattering elements or diffuse reflectors may be used to increase the effective field of view of the fiber, therefore increasing the effective field of view of the probe.

The basic optical probe design may be applied in a variety of combustor and anywhere within the hot flow path of a system such as a boiler, furnace, smelter, or turbine engine that exploits combustion. The probes may be inserted into the hot gas path to collect emission from gases, particles, and surfaces within the field of view.

Transducer

Figure 4:
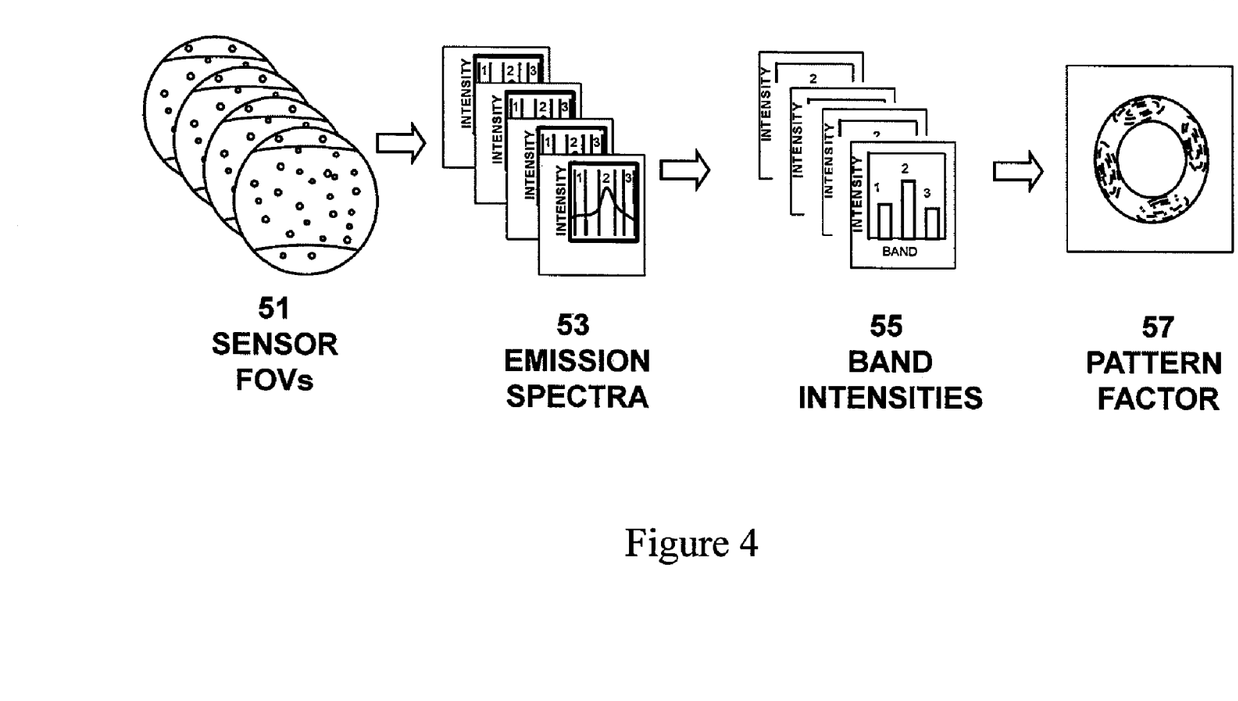
FIG. 4 illustrates the determination of pattern factor based on spectral emission arising from the sensors' fields of view according to the invention.

A transducer is used to convert the optical data collected by the probe to an electrical signal for use as an input to a control system 4 in FIG. 1. The overview of the process of producing the control input is shown in FIG. 4. Each sensor collects the optical emission from its field of view 51. The optical signals are characterized by a spectrum 53. The transducer uses an optical detector to record the intensity of the spectrum in a plurality of spectral bands 55, each of which is characteristic of a specific emitter, or combinations of emitters, within the field of view. The intensities in each band are compared to produce an output proportional to a physical property of interest, such as temperature, fuel/air ratio, or the concentration of product species. The output signal is independent of the overall intensity of the light received by the sensor. The output signal is sent to the controller which compares the outputs of the various sensors to produce a map of the sensed sensor response 57, which corresponds to the map of the measured physical property.

In one embodiment, shown in FIG. 2A, the transducer contains a splitter means 60 that delivers a fraction of the collected radiation to a plurality of photo-detector elements 33 and 34. The splitter may be a fiber-optic splitter or fiber-optic bundle. Each of the detector elements is equipped with a band-pass filter that passes light within the pre-selected spectral pass-band. The photo-detectors convert the optical radiation into an electrical signal. Additional signal processing electronics located in the controller process and compare the spectral intensities in the various pass-bands to develop an intensity-independent signal proportional to the measured combustion quantity. Alternatively, the signal processing electronics can be incorporated within the transducer.

In another embodiment, the transducer uses dispersive means, such as a spectrograph, to spectrally resolve the radiation, and an array of detectors to measure the intensity within the pass-bands. In another embodiment, the splitter means uses a spectrally selective element to divide the light among multiple fibers, each fiber transporting light in a specific pass-band to a separate detector element.

In another embodiment the spectral bands are detected using a single detector and a spectrally tunable filter. The spectrally tunable filter is tuned repetitively between spectral pass-bands and the intensity in each pass-band is determined from the time varying signal.

The transducer may also contain signal conditioning electronics to remove background offsets, adjust for detector gain variation, and perform background subtraction.

Nature of Optical Emissions Observed in Different Combustors and Different Locations The spectral pass-bands are selected based on the type of combustor and the placement of the optical probes. Knowledge of the combustion design and the related optical signatures is used to select viewing geometries and spectral bands that indicate of the degree of combustion within the combustor segment. Some spectral bands will emphasize one zone of the combustor, others will emphasize another zone of the combustor. The system makes use of the known characteristics of the combustor and monitors specific emission bands that are characteristic indicators of the fuel/air ratio for the specific combustor design. Spectral bands and viewing geometry are selected to produce a signal that is characteristic of the average fuel/air ratio in the combustor segment.

The probe is typically packaged within the fuel nozzle, which provides convenient egress through the pressure vessel and combustor liner. In the case of a Rich Quench Lean combustor, with the probe collocated with the fuel nozzle, the zone closest to the probe is the primary combustion zone 14 in FIG. 1. Air and fuel are injected into that zone to form a rich combusting mixture that has a relatively high fuel/air ratio compared to that of the combustor overall. Additional air is injected downstream, where it mixes and continues secondary combustion. Ideally, the flow is fully mixed and combustion is complete at the exit of the combustor. In some spectral bands, the probe in the front end will preferentially collect radiation from the primary combustion zone immediately proximal to the probe. Light from other zones may be partially absorbed or scattered by interactions with gases and particles in the zones closest to the sensor probe. In certain spectral bands, the primary zone is optically thick and blocks the transmission of radiation from the downstream zones. In other spectral bands, the primary zone is optically thin, allowing the collection of radiation from the downstream zones.

Alternatively, the probe may be placed in other locations within the combustor and combustor exhaust stream. It may be mounted in the front end, but have a viewing geometry that avoids the rich primary zone. It can be placed near the combustor exit to view the fully combusted flow, or may be inserted in a downstream location such as the turbine to monitor the hot flow path and surfaces downstream of the combustor. The probe may also be placed outside the combustor and view the hot flow gas through an air input or other opening in the combustion vessel. Additional ancillary probes of a similar nature may be placed in different openings to provide alternative views of the flow path. These can yield additional information about the flame location or flame condition.

Spectral Features

Figure 5A:
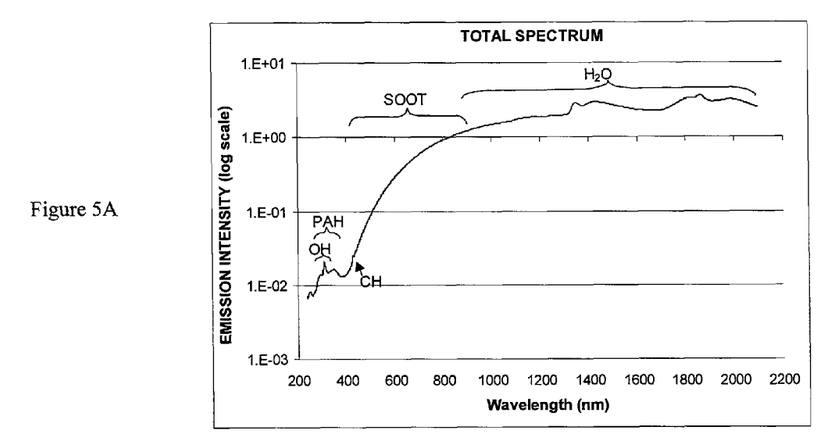
FIGS. 5A and 5B show some characteristic features of the emission spectrum collected by the sensor, with the total spectrum illustrated in FIG. 5A, and the contribution from soot, walls, and molecular emissions illustrated in FIG. 5B.
Figure 5B:
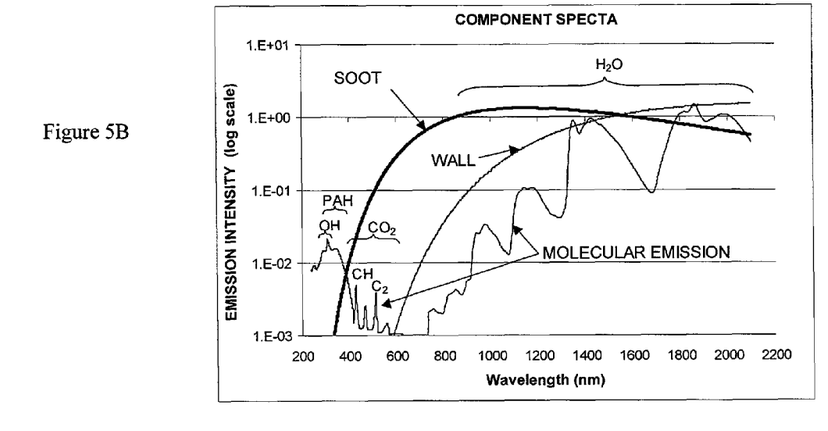

FIGS. 5A and 5B illustrate some of the spectral emission features of a high-pressure RQL combustor that are collected by the probe, and may be used for combustion monitoring. The figures show a simulation of the spectral signals collected over the spectral range transmitted by the probe, which can extend from 0.2 microns in the UV, to 2.2 microns in the short-wave infrared. The exact intensity in each spectral band is dependent upon the combustion conditions at each zone along the line of sight and the viewing geometry. The collected radiation will include background radiation from the combustor walls, emission from soot formed in the primary combustion zone, and a variety of molecular emission features from thermal and non-thermal emitters. The soot emission is thermal and follows the Plank Blackbody law, with emission peaking in the visible region and minimal emission in the ultraviolet. The wall emission is also thermal, but because of the lower wall temperatures has minimal intensity in the visible region. The thermal molecular emitters include water in the near-visible and short-wave infrared, with broad bands near 0.8, 0.9, 1.1, 1.4, and 1.7 microns, and OH in the vicinity of the 310 nm band in the UV. Thermal emission from molecular species track the fuel/air ratio and temperature, and are thus very good indicators of combustion quality provided that the probe views only well mixed regions, such the exit of a rich-burn combustor, or a lean-premixed combustor. For a rich-burning engine, soot and chemiluminescent emission from the rich primary combustion zone are usually much brighter than the thermal emission signatures.

A probe that is mounted in the front end of a rich-burning engine detects chemiluminescent radiation from the active flame region. UV chemiluminescent emission can be substantially brighter than the thermal radiation from the soot and walls, and thus makes a good indicator of combustion. Chemiluminescent emission is emission that arises from reactive collisions in the active combustion zone, and includes emission from OH, NO, polyaromatic hydrocarbons (PAH) and $CO_2$ in the UV portion of the spectrum (0.2-0.4 microns), and CH, $C_2$, $CO_2$, and $NO_2$ in the visible part of the spectrum (0.4-0.7 microns). The visible chemiluminescent emissions are often used as indicators of fuel/air ratio in relatively lean natural gas-fueled burners and boilers. However, these visible spectral features are usually obscured by soot emission in RQL engines and other rich-burn and liquid-fueled combustors. The UV chemiluminescent emitters are better choices for use in engines with rich primary zones, as the thermal soot emission is very weak at shorter wavelengths. The intensity of UV chemiluminescent emission can serve as an indicator of the amount of active combustion in the primary and secondary combustion zones, and when properly normalized can be an indicator of fuel/air ratio.

In one embodiment of the invention one of the spectral pass-bands monitors UV emission from chemiluminescent emitters, such as OH, PAH, and NO, and a second pass-band monitors soot and/or water emission. The ratio of intensity in the two pass-bands is proportional to the local fuel/air ratio in the segment influenced by the fuel nozzle.

In another embodiment of the invention, the spectral bands are selected to monitor the soot temperature, using two or more pass-bands in the visible and near visible region between 0.35-1.2 microns as the soot temperature in the primary zone tracks the local fuel/air ratio.

In another embodiment, two different chemiluminescent bands, or mixture of bands in the UV spectral region, are compared. For example, emission in any of the OH or PAH bands at wavelengths longer than 0.27 microns may be compared to bands at shorter wavelength characteristic of NO or other emitters.

In another embodiment, two or more bands from the same species are ratioed to produce an indicator of fuel/air ratio. Features of a chemiluminescent spectrum that change at different rates with respect to fuel/air ratio can be compared. For example, chemiluminescent OH band emission away from the band center can be compared to the optically thick band center at 310 nm. The optically thick parts of the OH band change more slowly with increasing fuel/air ratio than the optically thin emission bands away from the band center. The ratio of the two thus has a strong dependence on local fuel/air ratio.

Alternatively, two water bands, or two portions of a water band, with different temperature dependences may be used to produce a temperature-dependent signal. The approach is useful in cases where the emission from the fully combusted gases dominates the collected signal. This would be the case for pre-mixed combustors and for configurations where the field of view enhances the signal from the rear of the combustor.

Additional bands may be used to correct for background emission. For example, in the presence of soot and wall blackbody emission, the intensity of molecular emissions may be determined by correcting the emission in the molecular pass-band based on the measured emission in one or more near-by pass-bands containing blackbody emission. The blackbody emission underlying the molecular emission can be calculated using the measured blackbody emission and the known functional dependence of the blackbody emission on wavelength and temperature. The spectral bands may also be adjusted to exclude absorption from fuel and other compounds in the reacting flow stream.

Control System

The sensor signal is used as part of a feedback control system to adjust the fuel/air ratio to each of the segments of a combustor. In the preferred embodiment, a central control system would measure the affect of each of the fuel nozzles on the combustor and shift fuel flow among the nozzles to achieve a uniform distribution of local fuel/air ratios throughout the system. To accommodate this, a central control would vary the fuel flow to each of the nozzles, and monitor an appropriately conditioned signal from each sensor. The control system would measure the variation of the sensor signals with respect to the fuel flow variation to determine the sensitivity of the combustor to changes in fuel distribution among the fuel nozzles. Based on this data, the control system would alter the fuel distribution to achieve more uniform combustion, as measured by the sensor signals.

The control system may be distributed in several locations or housed in a single location. It includes a means of acquiring the signals from the transducers, a means of processing the signals to produce a signal for application to the fuel valves, and a means of transmitting the control signal to the fuel valves.

In the simplest embodiment, the controller and sensor are co-located with a fuel nozzle and control valve and the sensor signal is used to control a portion of the fuel flow to that nozzle to meet some target fuel/air ratio. The fuel valve would be capable of increasing or decreasing the fuel flow over a range that would typically be a fraction of the full fuel flow. The transducer would incorporate signal conditioning that would produce a proportional control signal for operating that fuel valve. The control signal would be responsive to the measured sensor signal, and to a signal set point. The signal set point may be a function of the engine operating conditions, and may be responsive to changes in engine operating conditions transmitted from a higher level controller.

In general, the sensors observe a region that is influenced by the fuel flow of more than one fuel valve. Ideally, the sensors will be most sensitive to the fuel flow from one or a small group of fuel valves. However, neighboring fuel nozzles can affect the local fuel/air ratio in a particular segment in ways that are not know a priori and can change with time. Therefore, the control system should be based on knowing the partial derivative of each sensor signal with respect to the fuel flow though each valve. This matrix of derivatives can be measured by modulating the fuel flow at each fuel valve in turn and monitoring the change at each sensor. This matrix might be measured once, or may be measured routinely as a matter of course during combustor operation.

In many applications the sensors can be set up with overlapping fields of view that incorporate parts of neighboring combustor segments. This results in a diagonally-banded matrix, where the width of the bands indicates the degree of crosstalk across burner segments. The crosstalk provides redundancy and a path to diagnosing sensor failure. It also provides an over-determined set of measurements that can compensate for sensor failure.

The partial derivatives can be used to solve a global minimization problem and determine a combination of fuel-flow changes that would decrease the overall variation of fuel/air ratio among the segments. This information can then be used to change the distribution of fuel to the various fuel nozzles, and the process iterated until a suitably stable result is achieved.

In a preferred embodiment the control system contains means of acquiring information about the nominal combustor set point and the state of the flow valves, means of setting the nominal fuel-flow at each valve, and means of modulating a small fraction of the fuel flow at each valve. The controller also has means of comparing the instantaneous fuel-flow at each valve to the instantaneous sensor signal to determine the effect of the fuel flow on the sensor signal. It also contains a data storage means for storing the control parameters and performance information about the combustor and engine system.

Figure 6:
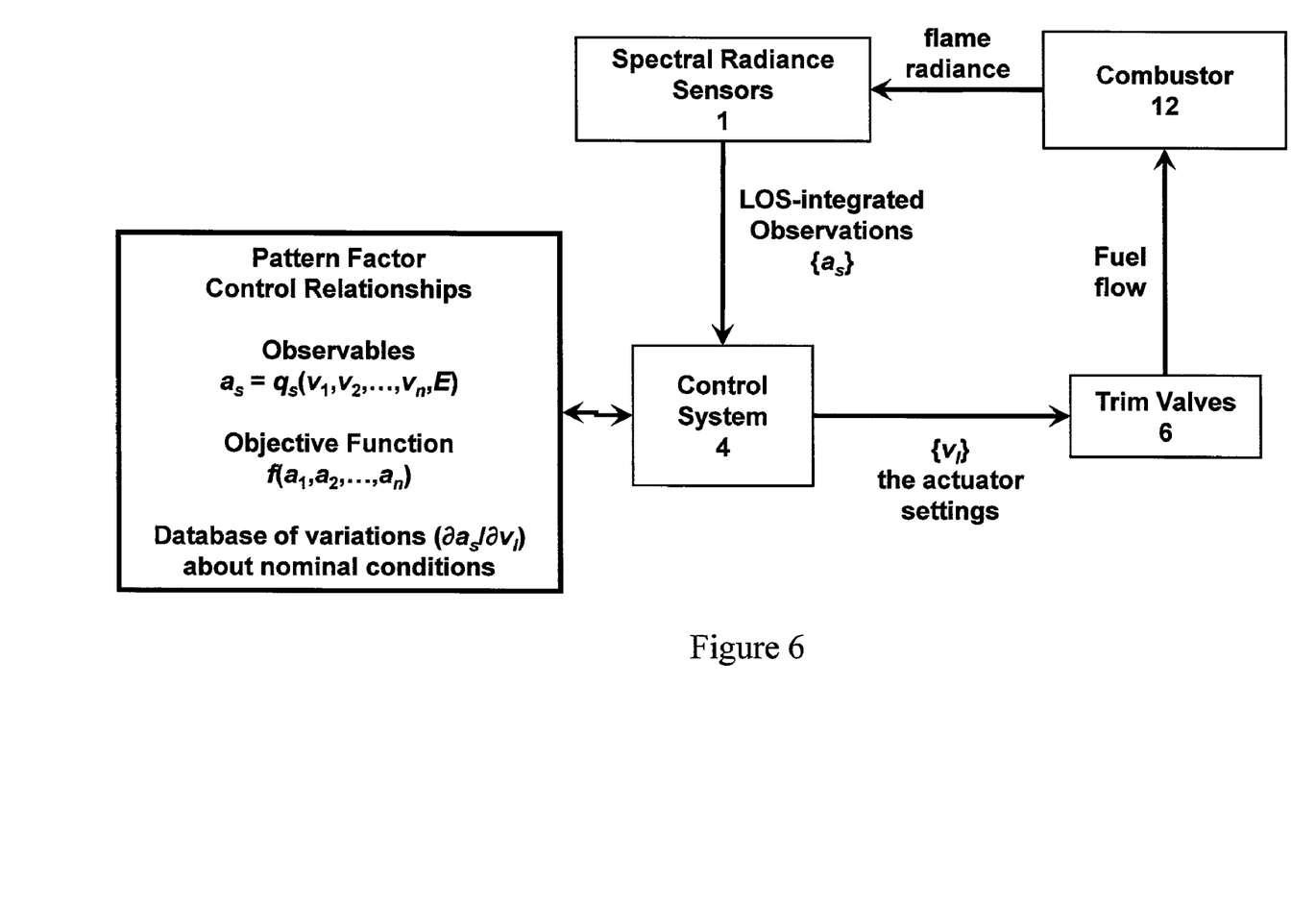
FIG. 6 is a schematic diagram of a control system architecture for the invention.

FIG. 6 is a schematic of one control system architecture. In this system control system 4 would use knowledge of the relationship between the signals measured by sensors 1 and the segment fuel/air ratios in combustor 12 to compute the desired changes in the fuel flow settings and adjust the trim valves 6. The global control system makes the combustion quality, which is typically fuel/air ratio, equal in all local combustion segments.

The local combustion quality, $q_s$, in segment s, can be expressed as a function of the state of the fuel valve settings, $v_i$, that control fuel flow to the fuel nozzles, indexed by the variable i, and other external factors, E, that are associated with the combustor operating characteristics. The goal is to minimize the deviation of the local combustion quality from the mean value. This is done by minimizing an objective function, $f$, that measures the deviation of the measured signals, $a_s$, in each local combustor segment, s, from the average. As long as the observed signals, $a_s$, vary monotonically with local combustion state, $q_s$, over some operating range, minimizing the objective function, $f$, will also minimize the deviation in combustion quality as measured among the ensemble $\{q_s\}$.

A system operating over a wide range of combustion conditions may make use of different control relationships at different nominal operating conditions. At each nominal condition, the sensor may produce a unique observable, $a_s$, that fulfills the criterion of being a monotonic function of $q_s$. The control system would be responsive to the nominal combustor conditions and select the appropriate sensor variable for the set-point conditions. For example, at full power setting it may rely on a ratio of pass-bands characteristic of a fuel-rich primary zone, such as soot and PAH emissions, but at idle it might use a ratio of OH pass-bands that have a strong dependence on fuel/air ratio under lean combustion conditions. In general, the sensor function, $a_s$, should be dependent on the nominal operating set-point and change smoothly over the range of operating conditions. For example, if the sensor output is a function of more than two bands the relative weighting among the bands may change as a function of nominal set-point allowing the control system to operate over the full range of combustor conditions.

In the simplest approach to a control system, the relationships between the valve state, the sensor signal, $a_s$, and the combustion quality, $q_s$, are known a priori. In this case, the derivatives, $\delta a_s/\delta v_i$, and $\delta f/\delta q_s$ are known explicitly and the control system need merely adjust the fuel flow to achieve the desired sensor response corresponding to the desired combustor operating point. In the extreme case, the bulk of the control system can be local to the fuel nozzle and valve and the control system, sensor, valve, and fuel nozzle can be packaged as a single unit. This packaged unit would be responsive to an operating set-point delivered from the central engine controller.

In the preferred embodiment, a more robust control system can measure the calibration of the system in real time. The fuel flow to specific fuel nozzles is modulated and the response of the sensors, $\delta a_s/\delta v_i$, measured directly. Furthermore, the control system need not be dependent on an exact calibration of $\delta f/\delta q_s$ in order to make the combustion quality, $\{q_s\}$, uniform in all segments. As long as the observed signals, $a_s$, are proportional to $q_s$, minimization of $f$ will result in improved combustion uniformity.

In a preferred embodiment, the objective function, $f$, is minimized by adjusting the average value of the valves so that the signals from all sensors indicate identical combustion conditions. The adjustment is made according to a matrix of variations of observed conditions with fuel flow. An important capability is to measure this database of variations; it is preferably measured by this method: control system 4 cyclically modulates the setting of the fuel trim valves 6 by an amount corresponding to a small portion of the fuel flow. The combustor 12 responds to the fuel modulation, producing a change in the observed spectral radiance, $a_s$, sensed by the sensors 1. The controller computes the variation of the observed signal as a partial derivative, $\delta a_s/\delta v_i$, that expresses the change in radiance in segment s, with respect to change in fuel valve, i. Once this database of partial variations is produced, the control system can compute a target fuel distribution among the various nozzles that will minimize the observed function, $f$. The valves are set to approach this target value, and the objective function measured again. The process is then iterated to convergence.

The fuel modulation waveform can take many forms. It may be a periodic modulation with a sinusoidal or other waveform, or a single pulse of a known duration. The modulation can happen slowly at subHZ frequencies, or at higher rates of several kHZ. The fuel valves may be modulated sequentially, or they may be modulated simultaneously at distinct modulation frequencies. The amplitude of modulation is typically a small fraction of the total fuel flow.

In one embodiment the modulation happens continuously as part of the measurement process. In a second embodiment the fuel modulation is used to occasionally measure the calibration of the sensors on a periodic (e.g., hourly or daily) time scale. The $\delta a_s/\delta v_i$ are stored and used in the control system in the same manner as outlined above, except that the target fuel flow settings are computed based on the stored derivatives and the relative contributions of each of the sensors to the objective function.

Figure 7:
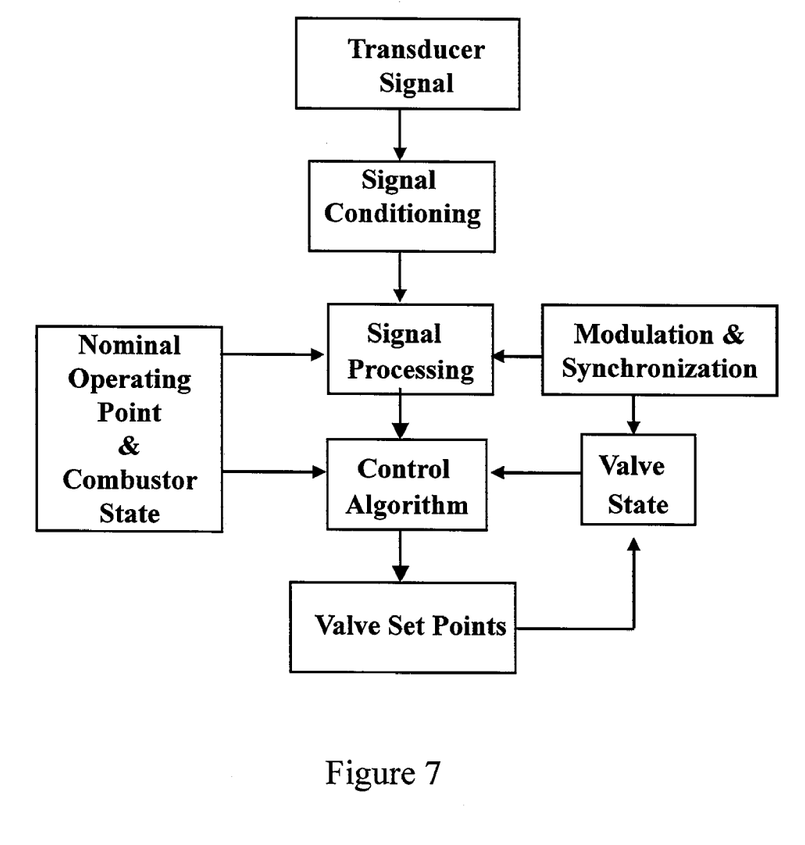
FIG. 7 is a schematic diagram of a control system flow for the invention.

FIG. 7 shows the data structure for collecting sensor signals and processing them to produce control signals. Data from the sensor and valves along with additional information about the state of the combustor is sent to a central controller, which can modulate the valve states about their nominal setting. The information on valve modulation, sensor condition, combustor condition, and combustor setpoint is processed by the controller that may, as an option, store information for later use. The control algorithm produces an output of recommended valve settings based on the current input signals and stored knowledge about the combustor and history of the control system.

Other Properties and Other Measurements

The inventive system may be applied to the measurement and control of physical parameters other than fuel/air ratio in combusting flows and combustion exhaust. While fuel/air ratio is an important global parameter that is related to many aspects of combustor operation, in many cases combustion control may be better achieved by controlling a related physical property such as temperature, flame front position, or wall heating.

The inventive system may be used in the sensing and control of larger systems that contain combustors, such as turbine engines, boilers, smelters, and glass furnaces. The sensors may be used to sense important operating characteristics by sensing the optical emission from gases, particles, and surfaces in the hot section of the larger system. The outputs of the sensors can be used as part of a larger control system that controls overall operation of the larger system. For example, in turbine combustors critical control parameters include peak gas temperature, heat capacity, flame front location, total heat flux, the chemical composition at the surface of a turbine blade, or the temperature of the surface of the turbine blade itself. In boiler control, critical control parameters include flame location, temperature, and flame incursion at the heat exchanger surfaces, and the temperature of the boiler walls. In glass furnaces and foundries the control parameters may be the temperature of a surface in the process flow. In many combustors where lean-blow out is a problem, flame location and acoustic instabilities must be monitored and controlled.

This invention can be tuned to monitor specific physical properties by proper selection of viewing geometry and spectral bands and to control such properties through proper conditioning of the sensor signal. For example, those applications requiring spatial location might use a probe with multiple lines of sight as shown in FIG. 4. Applications requiring local temperature measurement downstream of the active combustion region might use probes placed in downstream locations and might use the ratio of two water spectral bands to determine average temperatures and/or peak temperatures. Those applications concentrating on flame incursion, flame location, or acoustic instability might make use of chemiluminescent band emissions. Applications concerned with controlling the chemical composition may monitor alternative spectral bands characteristic of specific chemistry to be avoided. For example, they may monitor spectral bands associated with species such as $NO_x$ and CO, and chemiluminescent radiation from species such as $CO_2$, NO, HCNO that are indicators of chemical composition. Control systems may make use of temporal and spatial variations in the signals to develop indicators of the quality of combustion, and may process such signals along with other indicators of operating conditions, chemical composition and temperature to produce a conditioned signal for application to a control valve.

Although specific features of the invention are shown in some drawings and not others, this is for convenience only as some feature may be combined with any or all of the other features in accordance with the invention.

Other embodiments will occur to those skilled in the art and are within the following claims.

What is claimed is:

1. A system for controlling the uniformity of combustion over a range of operating conditions in a combustor that comprises a plurality of fuel nozzles that each spray a flow of fuel into the combustor, wherein each nozzle influences a state of combustion in a combustor segment, and wherein the combustor emits exhaust, the system comprising:
a plurality of optical sensors, each sensor comprising an optical probe that is located at least in part in a fuel nozzle and collects naturally occurring optical radiation emanating from a segment of the combustor within which combustion is primarily influenced by one or a small set of nozzles, and at least one transducer that receives the radiation collected by one or more of the probes, compares the intensity of collected radiation in a plurality of spectral pass-bands that are indicative of a fuel/air ratio in the combustor segments, and produces sensor output signals that are a function of the relative intensity observed in a plurality of pass-bands, where that function is independent of the overall intensity of the radiation and has a monotonic dependence on fuel air ratio within an operating range about a nominal set point;
a control system that receives the sensor output signals and in response controls the fuel flow to the fuel nozzles to achieve a predetermined pattern of sensor output signals that is indicative of a predetermined state of combustion;
wherein the control system causes a cyclical modulation of fuel flow to each fuel nozzle, monitors the resulting change of the optical radiation received by each sensor, and then determines the partial derivative of each sensor signal with respect to fuel flow through each nozzle; and
wherein the control system causes an adjustment of the fuel flow to each of the nozzles so as to reduce variations of sensor output signals among the combustor segments.

2. The system of claim 1 in which the combustor is part of a turbine engine, and the optical probes are located within a pressure casing of the engine and collect radiation from a high-temperature flow path, and wherein the transducers are located in a cooler region.

3. The system of claim 1 further comprising a plurality of fuel valves that controls the fuel flow to the nozzles, wherein a fuel valve is packaged with each fuel nozzle.

4. The system of claim 1 in which the combustor has a fuel-rich primary combustion zone, and in which the spectral pass-bands and the intensity comparison accomplished by the transducer produce a sensor output signal that is a function of fuel/air ratio at full power setting, based on the characteristic optical emissions from the fuel-rich primary combustion zone.

5. The system of claim 1 in which the probes collects radiation from at least one defined volume within a field of view of the probe, which extends from the probe through the hot-gas path to a solid object that has a surface, and includes different zones of the combustor with different combustion conditions and the surface of the solid object.

6. The system of claim 1 in which a functional form of the sensor output signal includes a dependence on the nominal set point and its associated characteristic optical emissions, and wherein specific spectral pass-bands are weighted differently at different nominal operating set-points.

7. The system of claim 1 in which an intensity of a molecular emission band is corrected for an intensity of underlying background radiation using a measurement of radiation intensity in a separate pass-band.

8. The system of claim 1 in which the transducer compares the intensity of collected radiation in two spectral pass-bands at two different wavelengths that originate from the same species.

9. The system of claim 8 in which the spectral pass-bands comprise soot emission in a spectral range of 0.35-1.2 microns.

10. The system of claim 1 in which the transducer compares the ratio of intensity of collected radiation in at least one spectral pass-band arising from chemiluminescent radiation in a spectral range of 0.2-0.4 microns and at least one spectral band at a longer wavelength arising in part from soot.

11. The system of claim 1 in which the transducer compares at least one of the spectral pass-bands that is associated with polyaromatic hydrocarbons emitting in a spectral range of 0.3-0.4 microns.

12. The system of claim 1 in which each probe comprises a high-temperature transmissive optical element exposed to a hot flow stream in the combustor or the combustor exhaust so as to collect naturally emitted radiation from the hot flow stream, and an optical fiber element that transmits the collected radiation to the transducer, wherein the transducer is located in a colder region.

13. The system of claim 1 in which a response of the sensors to fuel flow and nominal combustor conditions is used in calibration of the control system, prognostics of combustor condition, or fault diagnostics.

14. The system of claim 1 in which at least some of the combustor segments overlap one another.

15. The system of claim 1 wherein the control system determines an objective function, $f$, that measures a deviation of the sensor signals for each combustor segment from the mean of the sensor signals, and wherein the control system causes adjustment of the fuel flow so as to minimize the objective function, $f$.

16. The system of claim 15 wherein the control system causes adjustment of the fuel flow so as to minimize the objective function, $f$, by causing the adjustment of the average fuel flow to each of the nozzles such that all of the sensor signals are indicative of identical combustion conditions.

17. A system for controlling the uniformity of combustion over a range of operating conditions in a combustor that defines a plurality of overlapping combustor segments, wherein the combustor is part of a turbine engine that has a pressure casing and defines a high-temperature flow path, and wherein the combustor emits exhaust, the system comprising:

a plurality of fuel nozzles that each spray a flow of fuel into the combustor, wherein each nozzle influences a state of combustion in a combustor segment;

a plurality of fuel valves that control the fuel flow to the nozzles, wherein a fuel valve is packaged with each fuel nozzle;

a plurality of optical sensors, each sensor comprising an optical probe that is located at least in part in a fuel nozzle and collects naturally occurring optical radiation emanating from a segment of the combustor within which combustion is primarily influenced by one or a small set of nozzles, wherein the probes collect radiation from at least one defined volume within a field of view of the probe, at least some of which extend from the probe through the hot-gas path to a solid object that has a surface, and includes different zones of the combustor with different combustion conditions and the surface of the solid object;

a plurality of transducers located in relatively cool regions outside the high-temperature flow path, the transducers receiving the radiation collected by one or more of the probes, comparing the intensity of collected radiation in a plurality of spectral pass-bands that are indicative of a fuel/air ratio in the combustor segments, and producing sensor output signals that are a function of the relative intensity observed in a plurality of pass-bands, where that function is independent of the overall intensity of the radiation and has a monotonic dependence on fuel air ratio within an operating range about a nominal set point, in which a functional form of at least one sensor output signal includes a dependence on the nominal set point and its associated characteristic optical emissions, and wherein specific spectral pass-bands are weighted differently at different nominal operating set-points, in which an intensity of a molecular emission band is corrected for an intensity of underlying background radiation using a measurement of radiation intensity in a separate pass-band;

wherein each probe comprises a high-temperature transmissive optical element exposed to a hot flow stream in the combustor or the combustor exhaust so as to collect naturally emitted radiation from the hot flow stream, and an optical fiber element that transmits the collected radiation to the transducer, wherein the transducer is located in a colder region;

wherein at least one transducer compares the intensity of collected radiation in two spectral pass-bands at two different wavelengths that originate from the same species, wherein the spectral pass-bands comprise soot emission in a spectral range of 0.35-1.2 microns;

wherein at least one transducer compares the ratio of intensity of collected radiation in at least one spectral pass-band arising from chemiluminescent radiation in a spectral range of 0.2-0.4 microns and at least one spectral band at a longer wavelength arising in part from soot;

wherein at least one transducer compares at least one of the spectral pass-bands that is associated with polyaromatic hydrocarbons emitting in a spectral range of 0.3-0.4 microns;

wherein the combustor has a fuel-rich primary combustion zone, and in which the spectral pass-bands and the intensity comparison accomplished by the transducers produce sensor output signals that are a function of fuel/air ratio at full power setting, based on the characteristic optical emissions from the fuel-rich primary combustion zone;

a control system that receives the sensor output signals and in response controls the fuel flow to the fuel nozzles to achieve a predetermined pattern of sensor output signals that is indicative of a predetermined state of combustion;

wherein the control system causes a cyclical modulation of fuel flow to each fuel nozzle, monitors the resulting change of the optical radiation received by each sensor, and then determines the partial derivative of each sensor signal with respect to fuel flow through each nozzle;

wherein the control system causes an adjustment of the fuel flow to each of the nozzles so as to reduce variations of sensor output signals among the combustor segments;

wherein the control system determines an objective function, $f$, that measures a deviation of the sensor signals for each combustor segment from the mean of the sensor signals, and wherein the control system causes adjustment of the fuel flow so as to minimize the objective function, $f$; and wherein the control system causes adjustment of the fuel flow so as to minimize the objective function, $f$, by causing the adjustment of the average fuel flow to each of the nozzles such that all of the sensor signals are indicative of identical combustion conditions.

* * * * *